US010150183B2

(12) United States Patent
Thieme et al.

(10) Patent No.: US 10,150,183 B2
(45) Date of Patent: Dec. 11, 2018

(54) METHOD OF FORMING A COATING OR OF THREE-DIMENSIONAL STRUCTURAL ELEMENTS ON SUBSTRATE SURFACES, WHICH IS/ARE FORMED BY TIAL, BY LASER BUILD-UP WELDING

(71) Applicant: Fraunhofer-Gesellschaft Zur Foerderung Der Angewandten Forschung, Munich (DE)

(72) Inventors: Sebastian Thieme, Dresden (DE); Christoph Leyens, Dresden (DE); Steffen Nowotny, Radebeul (DE)

(73) Assignee: FRAUNHOFER-GESELLSCHAFT ZUR FOERDERUNG DER ANGEWANDTEN FORSCHUNG, Munich (DE)

( * ) Notice: Subject to any disclaimer, the term of this patent is extended or adjusted under 35 U.S.C. 154(b) by 255 days.

(21) Appl. No.: 14/390,473

(22) PCT Filed: Mar. 25, 2013

(86) PCT No.: PCT/EP2013/056258
§ 371 (c)(1),
(2) Date: Oct. 3, 2014

(87) PCT Pub. No.: WO2013/149872
PCT Pub. Date: Oct. 10, 2013

(65) Prior Publication Data
US 2015/0041442 A1     Feb. 12, 2015

(30) Foreign Application Priority Data

Apr. 4, 2012 (DE) .......................... 10 2012 007 114

(51) Int. Cl.
| | |
|---|---|
| B23K 26/00 | (2014.01) |
| B23K 26/342 | (2014.01) |
| B23K 35/32 | (2006.01) |
| B23K 35/28 | (2006.01) |
| B23K 35/02 | (2006.01) |
| B23K 26/12 | (2014.01) |
| B23K 26/0622 | (2014.01) |
| B23K 101/00 | (2006.01) |
| B23K 101/34 | (2006.01) |
| B23K 103/10 | (2006.01) |
| B23K 103/14 | (2006.01) |
| B23K 103/18 | (2006.01) |

(52) U.S. Cl.
CPC ........ *B23K 26/342* (2015.10); *B23K 26/0622* (2015.10); *B23K 26/123* (2013.01); *B23K 26/1224* (2015.10); *B23K 35/0266* (2013.01); *B23K 35/0277* (2013.01); *B23K 35/286* (2013.01); *B23K 35/325* (2013.01); *B23K 2101/001* (2018.08); *B23K 2101/34* (2018.08); *B23K 2103/10* (2018.08); *B23K 2103/14* (2018.08); *B23K 2103/18* (2018.08); *F05D 2230/90* (2013.01)

(58) Field of Classification Search
CPC ................................ B23K 26/00; B23K 26/24
USPC ............ 219/121.62, 121.63, 121.64, 121.65, 219/121.66
See application file for complete search history.

(56) References Cited

U.S. PATENT DOCUMENTS

| | | | | |
|---|---|---|---|---|
| 4,947,463 | A * | 8/1990 | Matsuda ................. | B05B 7/228 219/121.66 |
| 5,368,947 | A * | 11/1994 | Denney ................. | B23K 26/34 404/19 |
| 5,910,376 | A | 6/1999 | Kelly | |
| 6,429,402 | B1 * | 8/2002 | Dixon .................... | B23K 26/34 219/121.63 |
| 6,599,636 | B1 * | 7/2003 | Alger ........................ | C23C 8/02 148/275 |
| 6,843,866 | B2 * | 1/2005 | Brenner ............... | B23K 10/027 148/525 |
| 6,972,390 | B2 * | 12/2005 | Hu ....................... | B23K 26/032 148/525 |
| 8,076,607 | B2 * | 12/2011 | Lentz ................. | B23K 26/0078 219/121.64 |

(Continued)

FOREIGN PATENT DOCUMENTS

| | | |
|---|---|---|
| DE | 10 2010 026 084 A1 | 1/2012 |
| JP | 03249358 | 9/1991 |

OTHER PUBLICATIONS

H. Toshihibe et al., "Freeform Fabrication Method of Alloys & Intermetallic Compounds by 3D Micro Welding", Transactions of JWRI, vol. 32, No. 2, Dec. 1, 2008.

(Continued)

Primary Examiner — Dana Ross
Assistant Examiner — Ayub Maye
(74) Attorney, Agent, or Firm — Jacobson Holman, PLLC.

(57) ABSTRACT

The invention relates to a method of forming a coating or of three-dimensional structural elements on substrate surfaces which is/are formed by TiAl. Said coating/Said three-dimensional structural elements is/are manufactured by laser build-up welding. The procedure is followed in the method in accordance with the invention that titanium and aluminum are supplied into the region of influence of at least one laser beam in wire and/or band form in a pure or alloyed form in each case as a single wire or a single band. They are melted by the thermal input and in this respect the materials are mixed with one another. The coating or three-dimensional structural elements are thereby formed with TiAl on the substrate surface.

9 Claims, No Drawings

(56) References Cited

U.S. PATENT DOCUMENTS

| | | | |
|---|---|---|---|
| 9,278,407 B2* | 3/2016 | Lin | B23K 26/1429 |
| 2010/0155374 A1 | 6/2010 | Rabinovich | |
| 2011/0132878 A1* | 6/2011 | Wang | B23K 26/1429 |
| | | | 219/74 |
| 2013/0143068 A1 | 2/2013 | Richter et al. | |

OTHER PUBLICATIONS

S. Nowotny, "Current use of laser technology for build-up welding applications", Surface Engineering, vol. 27, No. 4, May 1, 2011.

* cited by examiner

METHOD OF FORMING A COATING OR OF THREE-DIMENSIONAL STRUCTURAL ELEMENTS ON SUBSTRATE SURFACES, WHICH IS/ARE FORMED BY TIAL, BY LASER BUILD-UP WELDING

The invention relates to a method of forming a coating or of three-dimensional structural elements on substrate surfaces which is/are formed by TiAl. Said coating/Said three-dimensional structural elements are manufactured by laser build-up welding. Components coated in this manner or provided with structural elements at the surface in this manner can advantageously be used in the high-temperature range, for example in turbines.

TiAl should be understood as alloys which at least contain the chemical elements Ti and Al. Further chemical elements could be contained in these alloys which should, however, be contained with portions which are as small as possible and which are substantially smaller than the portions of Ti and Al, A major component should in this respect be the formed intermetallic γ TiAl phase. This phase is brittle and these TiAl alloys have a small elongation at break which is typically less than 1%. The alloys can therefore be machined or processed with difficulty and then only in a complex and/or expensive manner.

The term substrates could be understood, in addition to the already mentioned components, also as any other bodies or workpieces shaped in any desired manner.

Three-dimensional structural elements can be elevated portions which are formed on a surface and which can have the most varied geometrical designs. In this respect, a plurality of such structural elements can be formed at intervals from one another or also elements could be formed in e.g. circular or rectangular form.

The weld materials in laser build-up welding are typically supplied in the form of a powder or of an already alloyed wire or band. Wires or bands from the brittle TiAl are, however, unsuitable due to the above-named properties. If, however, a powder mixture containing Ti and Al or a Ti—Al alloy powder is used, a practically complete powder utilization for the forming of the coating or of the three-dimensional structural elements cannot be achieved. Only a build-up of a coating or of structural elements is possible from above onto surfaces aligned horizontally or with a small inclination.

What is, however, more problematic on the use of a powder mixture, is the demixing of the individual components of the powder mixture which can occur on the powder feed as a consequence of the force of gravity, friction in the conveying devices, pressure fluctuations of a gas for the conveying or a clogging of powder nozzles.

It can moreover not be ensured that all components of the supplied powder mixture are actually melted so that the desired material composition cannot be maintained since a demixing can occur. No reproducible coating or formation of three-dimensional structural elements with a homogeneous coating material is thus possible, which naturally results in locally different properties of the coating or of the structure elements over the surface, in addition, only a reduced portion of the powder used for the build-up can be utilized which lies considerably below 100% of the total supplied powder quantity.

It is therefore the object of the invention to provide substrate surfaces with a coating or with three-dimensional structural elements by laser build-up welding, which is/are formed by TiAl, and in this respect to obtain a homogeneous built-up material on the respective substrate surface or a material having predefined portions of Ti and Al as well as, optionally, further alloy components.

This object is achieved in accordance with the invention by a method in accordance with claim 1. Advantageous embodiments and further developments of the invention can be achieved using features designated in the subordinate claims.

The procedure is followed in the invention that titanium and aluminum are supplied into the region of influence of at least one laser beam in wire and/or band form in a pure or alloyed form in each case as a single wire or a single band. The procedure can thus be followed in this respect as is typical in laser build-up welding using individually supplied wires or bands. The different materials are melted and mixed with one another in this respect due to the thermal input of the laser radiation. After the solidification of the melt, the coating or the three-dimensional structural elements is/are formed with TiAl on the substrate surface.

Powder filler wire or powder filler band can also be used.

The laser power and the energy density can be selected accordingly for the melting to ensure a complete melting of all components. The melting bath temperature can be maintained so that the melt has a small viscosity so that a good mixing of the individual components can be achieved by the melting bath movement.

As already indicated, the coating or the structural elements cannot only be formed from pure TiAl. At least one further alloy element can rather be a component of the built-up material. One or more alloy elements can in this respect already be contained in the material of a wire or of a band so that a wire or a band can comprise a corresponding titanium alloy or aluminum alloy.

There is, however, also the possibility of supplying at least one additional wire or one additional band, which comprises at least one such alloy element, into the region of influence of the laser radiation together with the two titanium and aluminum wires/bands and thus likewise to melt it so that a coating or structural elements can be obtained which are additionally alloyed therewith. Two wires or bands can also be supplied, with a wire or band therein already comprising an alloy of Ti or Al.

The coating or structural elements can thus be formed with at least one further metal as an alloy component which is selected from Nb, Ta, Mo, B, Cr and V. C can also be contained.

The material composition of the coating or of the structural elements can be influenced by the wire diameter, by the cross-section of one or more bands and/or by the feed speed of the supplied wires or bands. In this respect, with different wire diameters or cross-sectional areas of bands of titanium, aluminum and/or at least one addition element with a constant feed speed on the supply, the respective portion of these metallic elements can be set directly.

Such an influence is, however, also possible by a different feed speed of the individual wires or bands. This can be carried out in this manner with wires or bands which are of the same outer diameter or cross-section or also with different wires or bands. The feed speed can in this respect be regulated or controlled.

In this respect, a cross-section or a cross-sectional surface can be aligned perpendicular to the longitudinal axis of a wire or band and accordingly also perpendicular to the direction of supply movement.

Aluminum should be contained at a portion in the range from 35 at % to 55 at % in the built-up material to be manufactured, for which purpose wires or bands having a corresponding portion of aluminum can be used so that the coating or three-dimensional structural elements can contain or be formed with γ Ti—Al phase.

Mutually connected wires or bands can be supplied in the invention. The connection can take place in different manners in this respect, it can have been achieved by a connection having material continuity, force-transmission or shape matching. In this respect, additional connection elements can be used such as bands looping around the wires and/or bands. They can comprise a metal likewise co-forming the material to be built up, but also a material which can be completely removed by the influence of the laser radiation.

At least one wire can also be connected to at least one band with shape matching by a suitable deformation of the band(s) and they can then be supplied together at the same feed speed.

This can advantageously also be achieved by a simple twisting of a plurality of wires with one another.

An at least 100% utilization of the supplied materials can be achieved by the invention for the formation of the coating or structural elements.

The defined formation of the total built-up and metallurgically mixed material (TiAl alloy) can be promoted and set by the achievable melting bath movement which primarily occurs as a consequence of thermal potential differences and concentration differences in the melt.

An inert atmosphere should be maintained in the region of the melting bath by supply of an inert gas (e.g. argon). Work can also be carried out in a vacuum.

The respective applied material can be formed in situ from elements supplied with the wires or bands in the invention.

An intermetallic material can be built up and thus a coating or three-dimensional elements can be formed with the invention. In this respect, the high strength and temperature resistance of this material can advantageously be utilized.

In contrast to other manufacturing processes, a formation of structural elements or a specific layer thickness can be achieved which is very close to the end contour so that a complex and/or expensive reworking, which has to be carried out in a cutting manner as a rule, can be dispensed with or the effort for it can be substantially reduced. The material used with the wires can be utilized completely, at least almost completely.

The effort with respect to the energy input and the plant technology is relatively small, whereby the costs can likewise be kept small.

The method in accordance with the invention can be used with individual parts, with small batches, but also in mass production.

The invention will be explained in more detail by way of example in the following.

EXAMPLE 1

A coating having a 50Ti-44Al-6Nb alloy as the coating material is to be formed on the surface of a substrate of titanium based alloy (Ti6Al4V).

For this purpose, three individual wires, which are twisted uniformly with one another over the length, are supplied to the region of influence of a laser beam perpendicular with respect to the substrate surface. A NdYAG laser was used as a laser source having a power in the range from 1 kW to 3 kW. The laser beam was directed laterally coaxially to the surface of the substrate. It was focused such that the focal point could be arranged in the range −2 mm to 2 mm with respect to the substrate surface. A plurality of laser beams which can be irradiated from different directions distributed radially about the wires can also be used on the carrying out of the method.

A wire of pure titanium having an outer diameter of 0.75 mm, a wire of pure aluminum having an outer diameter of 0.7 mm and a wire of pure niobium having an outer diameter of 0.25 mm were used for the coating.

The mutually connected three wires were supplied at a speed in the range 1 m/min to 3 m/min. The substrate and the laser beam were moved relative to one another at a feed speed of 1 m/min to 3 m/min in the formation of the coating. A coating was thus able to be formed on the substrate surface with a layer thickness of 0.5 mm. The coating comprised the above-named material. It was free of pores and had no cracks. At the indicated speeds, a coating with a layer thickness between 0.3 mm and 1 mm can be formed by a suitable choice. A two-phase structure of γ TiAl and $Ti_3Al$ phase was formed.

EXAMPLE 2

The same procedure as in Example 1 can in principle be followed in this Example. Only one laser beam is directed perpendicular to the substrate surface. The supply of the wires can in this respect take place laterally, also manually in a trailing arrangement.

A laser beam used for melting in this respect has a focus diameter of 2 mm to 3 mm at the power such as can also be used in Example 1.

The laser light source can be operated in a pulsed manner with a pulse length in the range 10 ms to 20 ms, with a pulse energy in the range 30 J to 40 J. The movement of the laser beam can take place in an automated manner, and a feed speed in the movement of the laser beam between 1 mm/s and 2 mm/s can be observed.

Two wires are used of which one is formed with a Ti—Nb—Mo alloy and the other with an Al—B alloy.

The two wires are connected to one another in the supply by a connection element which loops around the wires and is from organic material which is preferably a material formed from fibers.

A coating can thus be obtained which has been formed from a Ti-(40-45)Al-(5-8)Nb, Mo-0.1B alloy.

A coating can thus be formed with a thickness in the range 0.5 mm to 0.8 mm with a degree of overlap of the individual tracks formed next to one another in the range 30% to 50%.

The invention claimed is:

1. A method of forming a coating or three-dimensional structural elements of an ahoy of TiAl on substrate surfaces, comprising,
supplying at least one laser beam at an angle with respect to the substrate surfaces, for laser build-up welding,
supplying at least two individual wires or bands into a region of influence of said at least one laser beam, said at least one laser beam providing thermal input into the region of influence, at least one of said at least two individual wires or bands being of titanium, in pure or alloyed form but without aluminum, at least a second of said at least two individual wires or bands being of aluminum, in pure or alloyed form but without titanium, melting said at least two individual wires or bands by the thermal input of said at least one laser beam, with the melted at least two individual wires or bands mixed with one another and then applied to the substrate surfaces to form said coating or three-dimensional structural elements of said alloy of TiAl on the substrate surfaces.

2. The method in accordance with claim 1, wherein the coating or three-dimensional structural elements are formed with at least one further metal as an alloy component which is selected from Nb, Ta, Mo, B, Cr and V and C.

3. The method in accordance with claim 1, wherein each of said at least two individual wires has a wire diameter, each of said bands defines a band cross-section, and said at least two individual wires or bands are supplied into said region of influence at a feed speed, wherein composition of the coating or three-dimensional structural elements are influenced by the wire diameter, the cross-section of one or more bands or the feed speed of the supplied of the at least two individual wires or bands.

4. The method in accordance with claim 1, wherein the said at least two individual titanium and aluminum wires or bands are supplied by means of a powder filling wire or a powder filling band.

5. The method in accordance with claim 1, wherein aluminum having a portion in the range 35% to 55% is used in the aluminum wire or band.

6. The method in accordance with claim 1, wherein the coating or three-dimensional structural elements are formed with γ TiAl phase.

7. The method in accordance with claim 1, wherein said at least two individual wires or bands are mutually connected.

8. The method in accordance with claim 1, wherein mutually twisted wires are supplied.

9. The method in accordance with claim 3, wherein the supply speed of the at least two individual wires or bands are regulated or controlled.

\* \* \* \* \*